Aug. 22, 1944.   W. A. HISLOP   2,356,406
TILE CUTTING MACHINE
Filed March 9, 1942   2 Sheets-Sheet 2
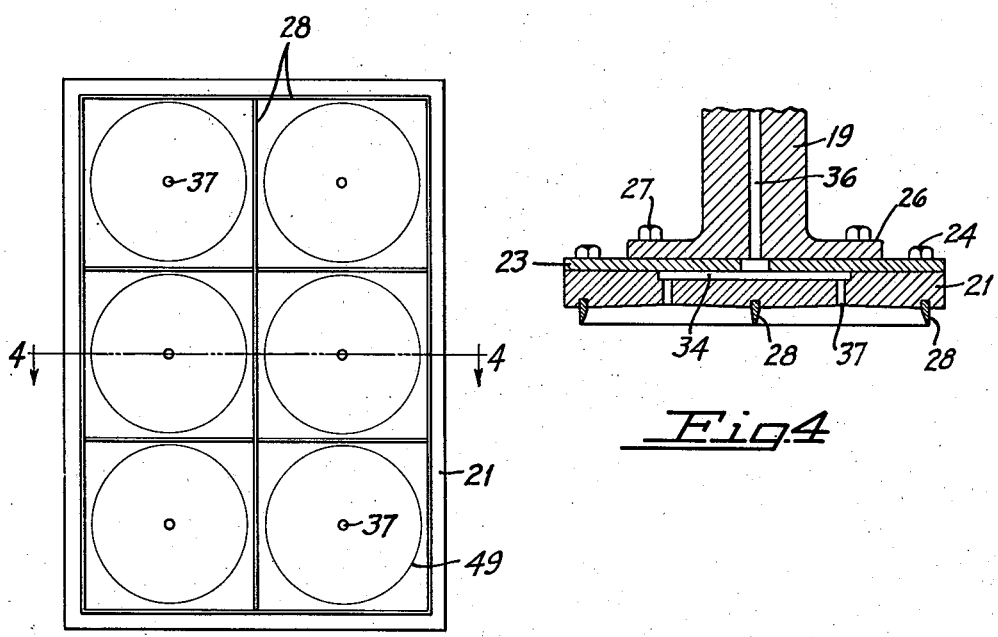
Fig.3
Fig.4
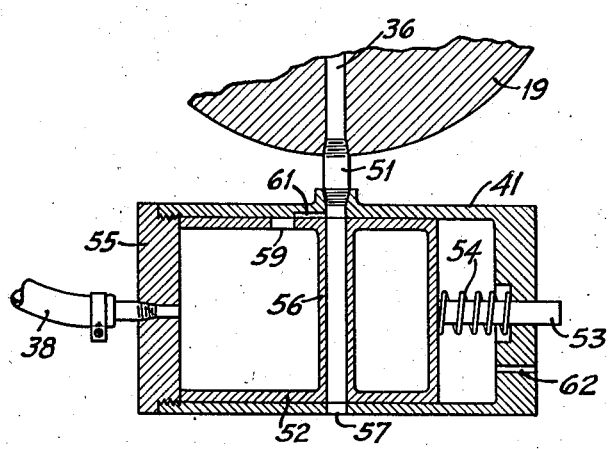
Fig.5
INVENTOR
WILLIAM A. HISLOP
BY Charles J. Evans
HIS ATTORNEY Patented Aug. 22, 1944

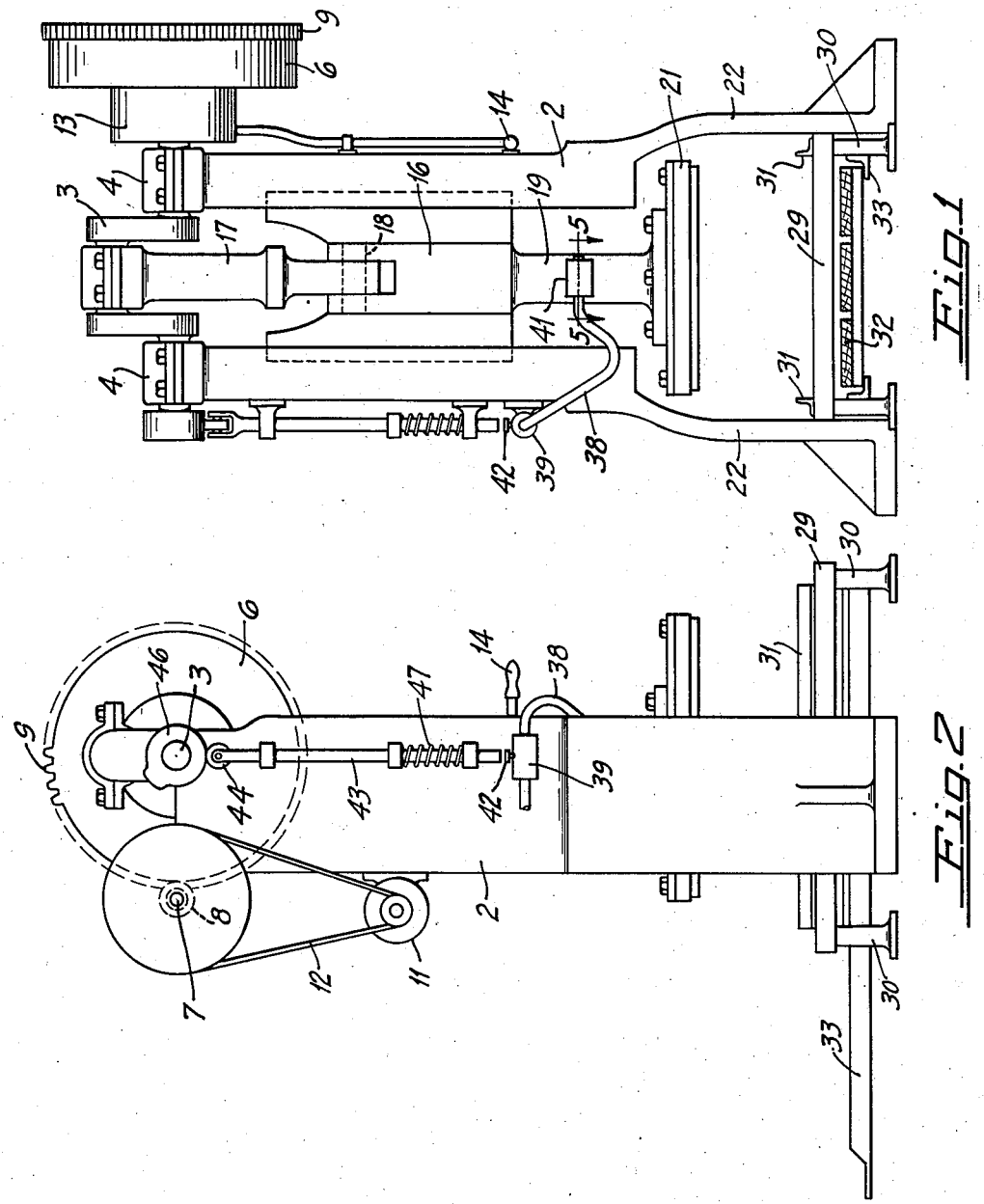

2,356,406

UNITED STATES PATENT OFFICE 2,356,406

TILE CUTTING MACHINE

William A. Hislop, Richmond, Calif.

Application March 9, 1942, Serial No. 434,020

1 Claim. (Cl. 25—105)

My invention relates to a machine for cutting tiles from a sheet of raw tile forming material, preparatory to curing the tiles in a furnace.

It is among the objects of the invention to provide a machine embodying a power driven die for cutting the tiles, which machine is capable of producing superior tiles at a faster rate and with less labor than machines heretofore used.

Another object is to provide a machine of the character described having improved means for ejecting a tile from the die.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claim.

Referring to the drawings:

Figure 1 is a front elevational of a machine embodying the improvements of my invention; and Figure 2 is a side elevational view of the same.

Figure 3 is a bottom view of the tile cutting die.

Figure 4 is a transverse sectional view of the die, taken in a plane indicated by line 4—4 of Figure 3.

Figure 5 is a detail sectional view of the relief valve, taken in a plane indicated by line 5—5 of Figure 1, and on considerably larger scale than that shown in Figure 1.

In terms of broad inclusion my tile forming machine comprises a base plate for receiving a sheet of tile forming material, and a movable die for cutting the material on the plate into tiles of predetermined shape. The die is preferably carried by a reciprocative head for moving the die through cutting and recovery strokes. Improved means are also provided for ejecting a tile from the die.

In greater detail, and referring to the drawings, my machine comprises a frame 2 on the upper end of which is journaled a crank shaft 3 in suitable bearings 4. The shaft carries a loose fly wheel 6 driven from a countershaft 7 having a pinion 8 meshed with teeth 9 formed on the periphery of the fly wheel. Counter shaft 7 is in turn driven by a motor 11 through a belt drive 12. A suitable clutch 13 interposed between the fly wheel and crank shaft, and manually controlled by a trip lever 14, functions to rotate the crank shaft through one revolution. After completing a revolution the clutch automatically disengages, rendering the crank shaft inactive until lever 14 is again tripped by the operator. This is in accordance with ordinary punch press operation.

A reciprocative cross head 16 is slidably mounted in suitable ways on the frame, and is actuated by a connecting rod 17 journaled on the crank shaft and joined to the cross head by a wrist pin 18. This cross head has a depending shank 19 to the lower flanged end of which the tile cutting die 21 is secured. Thus for each revolution of the crank shaft the die is given a downward stroke and then returned to the position shown in Figure 1. In order to give room for the die to work, leg portions 22 of the frame are spread apart to provide the necessary clearance.

As shown in Figures 3 and 4, the die is generally rectangular in shape having an upper plate 23 secured to the body plate 21 by screws 24. Plate 23 is in turn fastened to flange 26 of shank 19 by screws 27. The cutting is done by thin metal strips or knives 28 set edgewise in grooves formed in the base of plate 21. These knives may be arranged in any suitable manner, depending upon the shape of tiles desired; the arrangement shown in Figure 3 for cutting square tiles being merely for purposes of illustration.

The sheet of raw material to be cut is held by a base plate 29 mounted on standards 30 below the die. This base plate is carefully positioned so that knives 28 just touch its upper surface when the die is at the bottom of the cutting stroke. A surface sheet of soft material, such as zinc, on the base plate affords protection for the knives. Zinc also has the advantage of helping to keep the tiles from sticking to the base plate. A sheet of the raw tile forming material is deposited on the base plate 29 by any suitable means, either by a mechanical feeding device or by hand. Guide bars 31 on the base plate aid in positioning the sheet under the die.

The operator then trips lever 14 to reciprocate head 16, causing the die to cut the raw sheet material into the tile shapes. With a properly designed die the newly cut tiles are left lying on the base plate when the die retracts. The next piece of sheet material moved into position under the die functions to push the newly formed tiles off the base and onto a wooden rack 32 slidably mounted on rails 33 below plate 29. The tiles may then be carried off on this rack for further treatment.

An important feature of my invention resides in the provision of means for ejecting the newly formed tiles from the die. Unless such means is provided the tiles stick in the cavities formed between knives 28 and die plate 21, resulting in the tiles being carried upwardy with the die during its recovery stroke. This is prevented in my machine by a special means employing a pressure fluid for ejecting the tiles.

As shown in Figures 3 and 4, the die plate 21 has passages 34 communicating with a central passage 36 in shank 19 and opening out through ports 37 located at the centers of the die cavities. A pressure fluid, such as compressed air, is supplied to the shank passage through a flexible duct 38 in which is interposed a control valve 39 and a relief valve 41.

Valve 39 may be any suitable type which is normally closed and is adapted to be opened by depressing a spring pressed plunger 42. Opening of valve 39 is controlled by a rod 43 slidably mounted on frame 2 and carrying a follower roller 44 engageable with a cam 46 on crank shaft 3; a spring 47 disposed about the rod serving to hold the follower against the cam. Cam 46 is shaped to extend rod 43 and open valve 39 at the instant die 21 starts upward in its recovery stroke. The compressed air flowing downward through shank passage 36 thus builds up a pressure behind the newly cut tiles in the die cavities. This pressure holds the tiles against base plate 29 and forces the tiles to be ejected upon retraction of the die, without permitting the tiles to be lifted from the base plate. After the die has been lifted free of the tiles, cam 46 operates to close valve 39.

The particular advantage of this ejecting means is that the tiles lie flat on base plate 29 at all times. The possibility of damaging the relatively fragile tiles is therefore reduced to a minimum. In order to apply the pressure over a wide area of the tiles I prefer to form a depression in plate 21 at the base of each cavity. A slight taper from a circular margin 49 toward the central port 37 is sufficient to allow the air to fan out over the upper surface of the tile.

Means are also provided for venting passage 36 to the atmosphere so as to relieve pressure behind the tiles in the die cavities during the cutting stroke. This is accomplished by relief valve 41. As shown in Figure 5, valve 41 comprises a tubular casing having a side nipple 51 threaded into shank 19 to provide communication between the casing and a transverse portion of the shank passage 36. A slidable valve plunger 52 having a squared guide stem 53 is normally urged toward one end of the casing by a spring 54, in which position a transverse tube 56 on the plunger is aligned with the nipple and with an outlet 57 in the opposite wall of the casing. Under these conditions, which obtain whenever valve 39 is closed, the air trapped in the die cavities is free to flow out through outlet 57. This allows the tiles being cut to slide freely into the die cavities without resistance of back pressure.

When control valve 39 is opened at the start of the recovery stroke, the air from duct 39 passes into the casing through end plate 55 and forces plunger 52 toward the opposite end of the casing. This closes outlet 57 and establishes communication between nipple 51 and the interior of the casing through a port 59 in the plunger. The air from supply duct 38 now flows through passages 36 and 34 and discharges into the die cavities behind the tiles to eject the latter when the die retracts. When valve 39 is subsequently closed the spring 53 moves plunger 52 back again to vent the passages to the atmosphere. A groove 61 in the casing side wall and an opening 62 in the end wall allow air to bleed out from the casing to permit free movement of the plunger.

I claim:

A tile cutting machine comprising a base plate for supporting a sheet of tile-forming material, a head, a die carried by said head and having a cavity only a portion of which is filled by the tile being cut, means for forcing the head and base plate toward each other to cut the tile, means including a valve for introducing air under pressure into that part of the cavity left unfilled by the tile and for connecting such cavity part with the open air, and means timed with the relative movement between head and base plate for operating the valve to permit air to flow from the cavity to a vent open to the atmosphere during cutting of the tile and air under pressure to flow into the cavity to eject the tile after cutting of the tile.

WILLIAM A. HISLOP.